Figure 1:
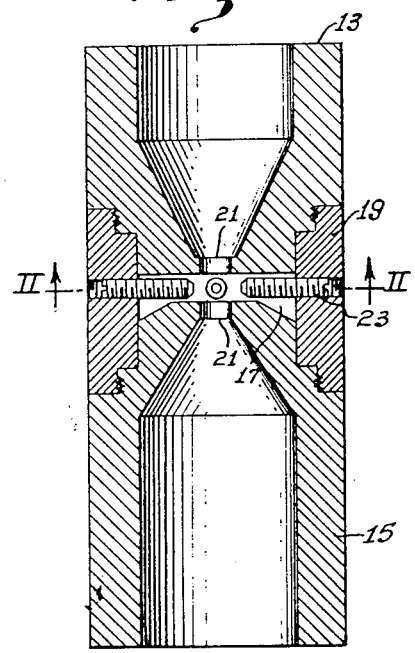

Dec. 7, 1948.   J. HILLIER   2,455,676
ELECTRON LENS CORRECTION DEVICE
Filed May 21, 1946

INVENTOR.
James Hillier
BY
Attorney

Patented Dec. 7, 1948

2,455,676

UNITED STATES PATENT OFFICE 2,455,676

ELECTRON LENS CORRECTION DEVICE

James Hillier, Cranbury, N. J., assignor to Radio Corporation of America, a corporation of Delaware Application May 21, 1946, Serial No. 671,184

12 Claims. (Cl. 250—49.5)

1

This invention relates generally to electron optical systems and more particularly to an improved method of and means for correcting for axial asymmetry in electromagnetic and electrostatic electron lenses.

Heretofore, it had been known that the resolving power of electron lenses was limited by the chromatic and spherical aberrations inherent in all such devices. In order to minimize such aberrations, the lens apertures were reduced to the smallest size permissible with practicable structural design. Also, various means and methods were developed for correcting for such spherical and chromatic aberrations.

It is now known that, in practice, asymmetries in the magnetic field of a magnetic electron lens or asymmetries in the electrostatic field of an electrostatic electron lens are the major reasons why the theoretical limit of resolving power of such lenses is seldom realizable. The ideal of a sufficiently symmetrical focusing field requires a precision of mechanical manufacturing technique and an extreme uniformity in the structural and electrical properties of the material comprising the lens which can seldom be realized. For example, axial symmetry to an accuracy of .00001 inch in a lens aperture having a diameter of $\frac{1}{16}$ inch is essential for an electron microscope lens in order to provide resolution of the order of ten angstrom units (10 Å.).

Notwithstanding extremely careful technique in the design and final adjustment of such lenses, the inherent axial asymmetry of the objective lens field in an electron lens microscope results in contour fringes in images obtained close to the lens focus. Such contour fringes, which may be interpreted on the basis of ordinary Fresnel diffraction, provide a sensitive criterion of such asymmetries, providing the phase relations between the interfering waves are properly interpreted.

The instant invention overcomes the practical difficulties of limitations in mechanical precision and non-uniformity in the magnetic or structural properties in the lens elements by the use of metallic correcting elements interposed in the lens field adjacent to the path of the electron beam. Relatively rough adjustment of the interposed metallic adjusting elements provides a convenient and effective means for distorting the electron focusing field to correct substantially completely for inherent axial asymmetries therein.

In a magnetic type electron lens as employed, for example, as an objective in a conventional microscope, the correcting elements may comprise a plurality of metallic rods, preferably of magnetically soft material, threaded into the non-magnetic spacing element disposed between the lens pole pieces, and disposed in a plane perpendicular to the path of the electron beam to be focused. Preferably the correcting elements should be disposed about the axis of the electron beam with equal angular spacings. By varying the distance of the inner ends of the threaded rods from the axis of the lens, and by observing the effect upon the lens resolving power, substantially complete correction of the original inherent lens asymmetry may be attained.

A similar arrangement may be employed for correcting for asymmetries in electrostatic electron lenses by employing a plurality of threaded rods having their centers coincident with a circle having its center at the electron beam axis. A plurality of such correcting screws preferably should be employed in combination with each of the outer grounded electrostatic lens elements. Adjustment of the spacing of the inner ends of the correcting screws from the inner high potential lens element provides a convenient and non-critical means of distorting the lens field to correct substantially completely for original asymmetries due to limitations of mechanical accuracy and lens conformation.

Among the objects of the invention are to provide an improved method of and means for correcting for axial asymmetries in an electron lens. Another object is to provide an electron lens including means adjustably disposed with respect to the lens field for correcting for axial asymmetries in said lens. A further object is to provide an improved electromagnetic electron lens having adjustable magnetic elements interposed in the lens field intermediate the lens pole pieces, whereby adjustment of said elements in a plane perpendicular to the lens axis provides a convenient and efficient means for correcting for asymmetries in the lens field and for non-uniformity in the magnetic and structural characteristics of the lens pole pieces. Another object is to provide a convenient and efficient means for correcting for axial asymmetries in an electron lens whereby such corrections may be made under operating conditions. A still further object of the invention is to provide an improved means for correcting for axial asymmetries in an electrostatic electron lens.

Figure 4:
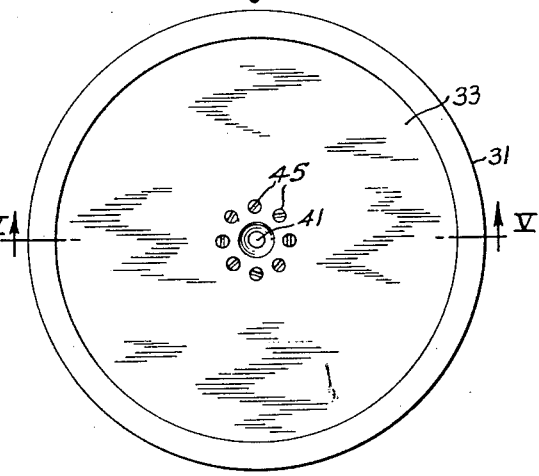
Figure 5:
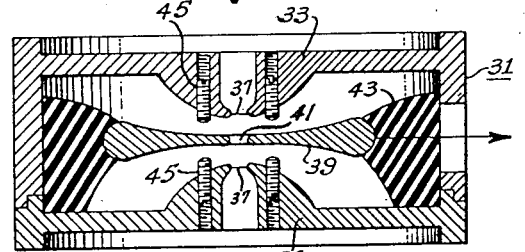
Figure 2:
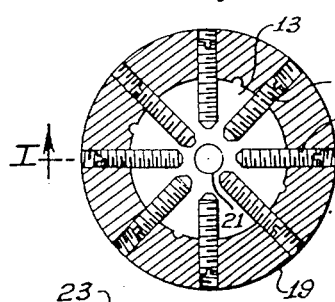
Figure 3:
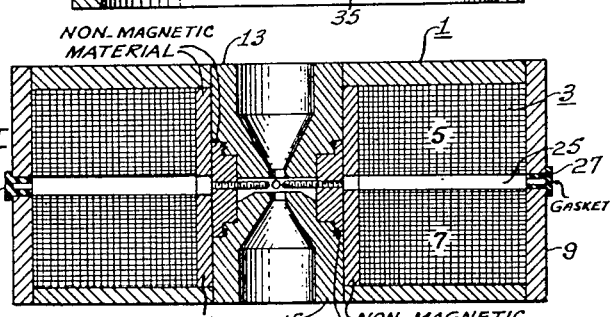
Figure 6:
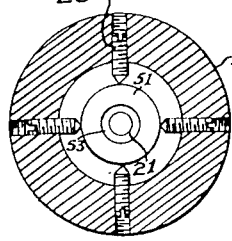

The invention will be described in greater detail by reference to the accompanying drawing of which Figure 1 is a cross-sectional elevational view, taken along the section line I—I of a conventional electromagnetic electron lens pole piece assembly including the correcting elements of the instant invention, Figure 2 is a cross-sectional plan view taken along the section line II—II of Fig. 1, Figure 3 is a cross-sectional elevational view of a complete electromagnetic electron lens including the invention, Figure 4 is a plan view of an electrostatic electron lens including the invention, Figure 5 is a cross-sectional elevational view taken along the section line V—V of Fig. 4, and Figure 6 is a cross-sectional plan view taken along the section line II—II of Fig. 1 of a modification of said electromagnetic lens including the invention. Similar reference characters are applied to similar elements through the drawing.

Referring to Figures 1, 2 and 3 of the drawing, an electromagnetic electron lens 1 of the type employed as an objective in a conventional electron microscope includes a winding 3 which preferably comprises upper and lower winding sections 5 and 7. The winding is enclosed within a magnetic casing 9 which includes an inner annular ring 11 of non-magnetic material such as brass. Upper and lower pole pieces 13, 15, respectively, are shaped to provide an air gap 17 which may be adjusted by threading the pole pieces to a central non-magnetic spacer 19. The pole pieces are shaped and spaced to provide the desired magnetic field for focusing an electron beam which is projected through a central aperture 21 in each of the pole pieces. The strength or focal length of the lens is determined by the magnitude of the electric current passed through the serially-connected lens windings 5 and 7. The central electron beam aperture 21 has a diameter of the order of $\frac{1}{16}$ inch. The spacer 19 and the pole pieces 13 and 15 should be extremely accurately machined and polished, and the axial alignment of the apertures 21 of the two pole pieces should be maintained as accurately as possible. However, since resolution of the order of 10 angstrom units is desirable in an electron microscope objective, the axial symmetry of the lens field must be maintained to better than one part in one hundred thousand. Because of inhomogeneities in magnetic materials, this condition is unattainable unless some correcting means for axial asymmetry is provided.

In order to correct for such inherent asymmetry, a plurality of metallic screws 23 are threaded into the non-magnetic spacer 19 and extend into the air gap 17 between the lens pole pieces. The correcting screws preferably should be of soft magnetic iron although they may be of non-magnetic conductive material. Preferably the screws 23 should be equally spaced about the lens axis. The penetration of the screws into the air gap 17 may be adjusted to compensate for asymmetries in the lens field.

If desired, the lens pole piece assembly including the pole pieces 13, 15 and the spacer 19 may be removed from the lens structure for adjustment of the correcting screws. Then the pole piece assembly is reinserted in the lens and measurements are made of the axial asymmetry as a function of the Fresnel fringes. However, if desired, apertures 25 may be provided through the outer lens structure to permit adjustment of the correcting screws without the necessity of removing the lens pole piece assembly. A plastic or rubber flexible gasket 27 may be provided for each of the adjusting screw apertures 25 in order to provide a vacuum seal therefor.

Figures 4 and 5 show an electrostatic type electron lens 31 having a pair of grounded outer electrodes 33, 35 each of which have central apertures 37, and a centrally disposed high potential electrode 39 having a central aperture 41. The high potential electrode 39 is supported within the grounded outer electrode structure by means of an annular insulator 43. Since the resolution of an electrostatic lens is principally dependent upon the accuracy with which the elements are machined and assembled, the use of field correcting elements is highly desirable. The correcting elements for such an electrostatic lens may comprise a plurality of adjusting screws 45 of conductive material disposed around the apertures in the pole pieces 33 and 35. The centers of the adjusting screws 45 should be arranged on a circle having its center on the electron beam axis, and the axes of the adjusting screws preferably should be parallel to the electron beam axis. Adjustment of the axial symmetry of the lens is provided by advancing or retracting selected ones of the correcting screws 45 on either or both of the outer grounded lens electrodes 33, 35. Since the adjusting screws are disposed on axes parallel to the electron beam axis, it is necessary that the entire lens assembly be removed from the microscope for adjustment of the correcting screws.

Figure 6 shows a modification of the invention as applied to an electromagnetic lens of Fig. 1 wherein the position of a soft iron washer 51 having a central aperture 53 may be varied by selective adjustment of the screws 23 threaded into the non-magnetic spacer 19. The hole 53 in the washer 51 may be round, elliptical or specially shaped as desired. Any other type of adjustable magnetic correction element, such as an adjustable iris may be employed to distort the lens field for axial correction thereof.

Thus the invention disclosed and claimed herein comprises an improved method of and means for correcting for axial asymmetry in electron lenses of electromagnetic or electrostatic types wherein relatively coarse adjustment of a plurality of conductive elements extending into the lens field may effectively correct for axial asymmetries in the lens due to very slight inaccuracies in machining and adjustment or non-uniformity of the structure of the lens pole pieces.

I claim as my invention:

1. In an electron lens having a plurality of apertured field elements for establishing a focusing field for an electron beam passing through the apertures of said elements, the improvement comprising an adjustable metallic element extending into said field adjacent to the path of the electron beam through said apertured field elements for selectively distorting said field to compensate for axial asymmetry of said beam focusing field.

2. In an electron lens having a plurality of apertured field elements for establishing a focusing field for an electron beam passing through the apertures of said elements, the improvement comprising an adjustable metallic element extending into said field adjacent to the path of the electron beam through said apertured elements, and means for selectively adjusting said metallic elements with respect to said apertured field elements for selectively distorting said field to compensate for axial asymmetry of said beam focusing field.

3. In an electron lens having a plurality of apertured field elements for establishing a focusing field for an electron beam passing through the apertures of said elements, the improvement comprising an annular adjustable magnetic element extending into said field adjacent to the path of the electron beam through said apertured elements, and means for selectively adjusting said magnetic elements with respect to said apertured field elements for selectively distorting said field to compensate for axial asymmetry of said beam focusing field.

4. In an electron lens having a plurality of apertured field elements for establishing a focusing field for an electron beam passing through the apertures of said elements, the improvement comprising a plurality of adjustable metallic elements threaded into said field elements and extending into said field adjacent to the path of the electron beam through said apertured elements, and means for selectively adjusting said metallic elements with respect to said apertured field elements for selectively distorting said field to compensate for axial asymmetry of said beam focusing field.

5. In an electron lens having a plurality of apertured field elements for establishing a focusing field for an electron beam passing through the apertures of said elements, the improvement comprising a plurality of adjustable metallic elements threaded into said field elements and extending into said field at substantially uniformly angularly spaced points adjacent to the path of the electron beam through said apertured elements, and means for selectively adjusting said metallic elements with respect to said apertured field elements for selectively distorting said field to compensate for axial asymmetry of said beam focusing field.

6. In an electron lens having a pair of apertured magnetic field elements for establishing a focusing magnetic field for an electron beam passing through the apertures of said elements, and a non-magnetic element interposed between and spacing said magnetic elements, the improvement comprising a plurality of adjustable metallic elements threaded into said non-magnetic element and extending into said field adjacent to and normal to the path of the electron beam through said apertured elements, and means for selectively adjusting said metallic elements with respect to said apertured field elements and said beam for selectively distorting said field to compensate for axial asymmetry of said beam focusing field.

7. A lens according to claim 6 wherein said adjustable metallic elements are of magnetic material.

8. A lens according to claim 6 wherein said adjustable metallic elements are of soft magnetic material and wherein said metallic elements have substantially uniform angular separation with respect to the axis of said electron beam.

9. A lens according to claim 6 wherein said adjusting means is selectively operable from the exterior of said lens during operation thereof.

10. A lens according to claim 6 having a plurality of apertures in said field establishing elements to provide for selectively adjusting said adjusting means from the exterior of said lens during operation thereof, and means for providing removable vacuum seals for said adjustment apertures.

11. In an electron lens having a plurality of apertured field elements for establishing a focusing electrostatic field for an electron beam passing through the apertures of said elements, the improvement comprising a plurality of adjustable metallic elements threaded into said field elements and extending into said field adjacent to the path of the electron beam through said apertured elements, and means for selectively adjusting said metallic elements with respect to said apertured field elements for selectively distorting said field to compensate for axial asymmetry of said beam focusing field.

12. In an electron lens having a plurality of apertured field elements for establishing a focusing electrostatic field for an electron beam passing through the apertures of said elements, the improvement comprising a plurality of adjustable metallic elements threaded into said field elements and extending into said field adjacent to and parallel with the path of the electron beam through said apertured elements, and means for selectively adjusting said metallic elements with respect to said apertured field elements for selectively distorting said field to compensate for axial asymmetry of said beam focusing field.

JAMES HILLIER.

REFERENCES CITED

The following references are of record in the file of this patent:

UNITED STATES PATENTS

| Number | Name | Date |
| --- | --- | --- |
| 2,208,406 | Benedict | July 16, 1940 |
| 2,220,973 | Marton | Nov. 12, 1940 |
| 2,305,761 | Borries et al. | Dec. 22, 1942 |
| 2,412,687 | Klemperer | Dec. 17, 1946 |